United States Patent [19]

Matsuura et al.

[11] 4,315,999

[45] Feb. 16, 1982

[54] PROCESS FOR PREPARING POLYOLEFINS

[75] Inventors: Kazuo Matsuura; Takeichi Shiraishi; Etsuo Kawamata, all of Kawasaki; Nobuyuki Kuroda, Yokohama; Mituji Miyoshi, Kanagawa, all of Japan

[73] Assignee: Nippon Oil Company, Limited, Tokyo, Japan

[21] Appl. No.: 189,823

[22] Filed: Sep. 23, 1980

[30] Foreign Application Priority Data

Sep. 26, 1979 [JP] Japan ................................ 54-122599
Dec. 6, 1979 [JP] Japan ................................ 54-157428

[51] Int. Cl.$^3$ .......................... C08F 4/02; C08F 10/00
[52] U.S. Cl. .................................. 526/114; 252/429 B; 252/429 C; 526/115; 526/121; 526/124; 526/125; 526/97; 526/352; 526/906
[58] Field of Search ................. 526/97, 114, 115, 116, 526/119, 124, 125, 121

[56] References Cited

U.S. PATENT DOCUMENTS 4,175,170 11/1979 Schweier et al. ................... 526/125

FOREIGN PATENT DOCUMENTS 1269067 3/1972 United Kingdom ................ 526/125
1335887 10/1973 United Kingdom ................ 526/124
1434264 5/1976 United Kingdom ................ 526/125

*Primary Examiner*—Edward J. Smith
*Attorney, Agent, or Firm*—Wyatt, Gerber, Shoup, Scobey & Badie

[57] ABSTRACT

An olefin is polymerized using a catalyst obtained by contacting (1) at least one of silicon or aluminum dioxide, (2) a compound of the formula ROH wherein R is a hydrocarbon radical having 1 to 20 carbon atoms, and (3) a substance obtained by supporting a titanium or a vanadium compound on a magnesium or manganese halide.

16 Claims, No Drawings

PROCESS FOR PREPARING POLYOLEFINS

BACKGROUND OF THE INVENTION

This invention relates to a new process for preparing polyolefins.

Heretofore, various methods have been known for preparing polyolefins, for example, a method wherein there is used a catalyst consisting of an inorganic magnesium solid such as magnesium halide, magnesium oxide or magnesium hydroxide and a transition metal compound such as a vanadium compound supported thereon. In these known techniques, however, the particles of the resulting polymer are amorphous, the bulk density is generally low and the particle size distribution is generally wide, so that a large amount of product is finely powdered, for which reason improvements have been sought from the standpoint of productivity and slurry handling. In addition, molding of polymers prepared according to such conventional methods causes dust problems and lowered molding efficiency. There have therefore been strong efforts to increase bulk density and reduce the amount of finely powdered material.

It is an object of this invention to remedy the above-mentioned drawbacks.

It is another object of this invention to provide a process for preparing polyolefins having a high bulk density, a narrow particle size distribution and a reduced proportion of finely powdered material.

It is a further object of this invention to provide a process for preparing polyolefins having the aforesaid characteristics as well as well shaped of polymer particles.

Other objects and advantages of this invention will become apparent from the following description.

SUMMARY OF THE INVENTION

The above-mentioned objects of this invention can be attained by using as a solid component a solid product, which is obtained by contacting together the following (i)-(iii), in the polymerization of at least one olefin in the presence of a catalyst comprising the said solid component and an organometallic compound:

(i) at least one compound selected from the group consisting of a silicon oxide and an aluminum oxide, (ii) a compound represented by the general formula ROH wherein R is a hydrocarbon radical having 1 to 20 carbon atoms, and (iii) a substance obtained by supporting at least one compound selected from the group consisting of a titanium compound and a vanadium compound on a solid compound containing at least one compound selected from the group consisting of a magnesium halide and a manganese halide.

According to the process of this invention, polyolefins having a narrow particle size distribution and a reduced porportion of a finely powdered particles are obtained in high activity, and their bulk density is very high. These characteristics are very advantageous in the polymerizing operation. Moreover, these polyolefins when subjected to molding cause few problems. Thus the preparation of polyolefins can be effected in an extremely advantageous manner.

Furthermore, the foregoing objects of this invention can also be achieved by using as a solid component a solid product, which is obtained by contacting together the following (i)-(iv), in the polymerization of at least one olefin in the presence of a catalyst comprising the said solid component and an organometallic compound:

(i) at least one compound selected from the group consisting of a silicon oxide and an aluminum oxide, (ii) a compound represented by the general formula ROH wherein R is a hydrocarbon radical having 1 to 20 carbon atoms, (iii) a substance obtained by supporting at least one compound selected from the group consisting of a titanium compound and a vanadium compound on a solid compound containing at least one compound selected from the group consisting of a magnesium halide and a manganese halide, and (iv) a compound represented by the general formula R'—O—R" wherein R' and R" are each a hydrocarbon radical having 1 to 20 carbon atoms and may be alike or different.

According to the process of this invention, there can be obtained polyolefins in high activity which polyolefins have well shaped polymer particles, a narrow particle size distribution, a reduced particles of a finely powdered portion, and a very high bulk density. By virtue of these characteristics the polymerizing operation can be effected extremely advantageously. Additionally these polymers when subjected to molding cause few problems. Thus the process of this invention is very advantageous for the preparation of polyolefins.

The well shaped of polymer particles of this invention are, for the most part spherical and have a smooth surface.

DETAILED DESCRIPTION OF THE INVENTION

The process of this invention is characterized by in the polymerization of at least one olefin using a catalyst comprising a solid component and an organometallic compound, using a specific solid product as the said solid component in the catalyst.

The silicon oxide used in the invention is silica, or a double oxide of silicon and at least one other metal of Groups I-VIII in the Periodic Table.

The aluminum oxide used in the invention is alumina, or a double oxide of aluminum and at least one other metal of Groups I-VIII in the Periodic Table.

As the double oxide of silicon or aluminum and at least one other metal of Groups I-VIII in the Periodic Table, mention may be made of the following natural or synthetic double oxides as typical examples: $Al_2O_3.MgO$, $Al_2O_3.CaO$, $Al_2O_3.SiO_2$, $Al_2O_3.MgO.CaO$, $Al_2O_3.MgO.SiO_2$, $Al_2O_3.CuO$, $Al_2O_3.Fe_2O_3$, $Al_2O_3.NiO$, $SiO_2.MgO$. These formulae are not molecular formulae, representing only composition; that is, the structure and component ratio of the double oxide used in the invention are not specially limited. It will be apparent that the silicon oxide and/or aluminum oxide used in the invention may contain a small amount of water adsorbed thereon and may also contain a small amount of impurity.

As the compound represented by the general formula ROH used in this invention are mentioned those wherein R is an organic radical having 1 to 20 in which 1 to 12, carbon atoms, preferably R may be a hydrocarbon radical such as alkyl, alkenyl, aryl or aralkyl, or analogous radical containing oxygen, nitrogen, sulfur, chlorine or other element. Examples are methanol, ethanol, isopropanol, butanol, pentanol, hexanol, octanol, phenol, chlorophenol, benzyl alcohol, methyl cellosolve, ethyl cellosolve, and mixtures thereof.

As the compound represented by the general formula R'-O-R" used in this invention are mentioned those wherein R' and R", which may be alike or different, are each an organic radical having 1 to 20, preferably 1 to 12, carbon atoms in which R' and R" may be each a hydrocarbon radical such as alkyl, alkenyl, aryl or aralkyl, or an analogous radical containing oxygen, nitrogen, sulfur, chlorine or other element. Examples are dimethyl ether, diethyl ether, diisopropyl ether, dibutyl ether, diamyl ether, tetrahydrofuran, dioxane, anisole, and mixtures thereof.

As the magnesium halide used in the invention there are employed substantially anhydrous ones such as magnesium fluoride, magnesium chloride, magnesium bromide, and magnesium iodide. Of these, magnesium chloride is particularly preferred.

As the manganese halide used in the invention, manganese chloride is especially preferred.

In this invention, moreover, as the magnesium halide and/or manganese halide there may be employed solids which contain as one component a magnesium halide and/or a manganese halide, for example: a magnesium halide and/or a manganese halide after treatment with an electron donor such as alcohol, ester, ketone, carboxylic acid, ether, amine or phosphine; a complex consisting of a magnesium halide and/or a manganese halide and a compound represented by the general formula $Me(OR)_m X_{l-m}$ wherein Me represents an element of Groups I-VIII in the Periodic Table, provided that titanium and vanadium are excluded from Me, l is the valence of the element Me, m is $0 < m \leq l$, X is a halogen atom, and R is a hydrocarbon radical having 1 to 20 carbon atoms and may be alike or different; product obtained by pulverizing together a magnesium halide and/or a manganese halide and a polycyclic aromatic compound; product obtained by pulverizing together a magnesium halide and/or a manganese halide and an anhydrous compound containing an element of Groups III and IV in the Periodic Table; and product obtained by pre-treating a magnesium halide and/or a manganese halide with an alcohol and by subsequent reaction with silicon tetrachloride or an organoaluminum compound. Thus all of known carriers prepared by using a magnesium halide and/or a manganese halide as a starting material are included. As more concrete examples there may be mentioned magnesium chloride after treatment with methanol, ethanol, methyl acetate, ethyl acetate, butyl acetate, ethyl benzoate, acetone, methyl ethyl ketone, diphenyl ketone, acetic acid, propionic acid, butyric acid, stearic acid, oleic acid, diethyl ether, dibutyl ether, diisoamyl ether, diphenyl ether, monoethyl amine, diethyl amine, triethyl amine, monopropyl amine, dipropyl amine, tripropyl amine, monobutyl amine, dibutyl amine, tributyl amine, monophenyl amine, diphenyl amine, triethyl phosphine or triphenyl phosphine; a complex of magnesium chloride and $Mg(OC_2H_5)_2$, $Mg(OC_2H_5)Cl$, $Al(OCH_3)_3$, $Al(OC_2H_5)_3$, $Al(OnC_3H_7)_3$, $Al(OiC_3H_7)_3$, $Al(OnC_4H_9)_3$, $Al(OsecC_4H_9)_3$, $Al(OtC_4H_9)_3$, $Al(OCH_3)_2Cl$, $Al(OC_2H_5)_2Cl$, $Al(OC_2H_5)Cl_2$, $Al(OiC_3H_7)_2Cl$, $Al(OiC_3H_7)Cl_2$, $Si(OC_2H_5)_4$, $Si(OC_2H_5)_3Cl$, $Si(OC_2H_5)_2Cl_2$, $Si(OC_2H_5)_3Cl$, $P(OC_2H_5)_3$, $P(OC_6H_5)_3$, $Ca(OC_2H_5)_2$, $Mn(OC_2H_5)_2$, $Fe(OC_2H_5)_3$, or $Zn(OC_2H_5)_2$; product obtained by pulverizing together magnesium chloride and naphthalene, anthracene, phenanthrene, triphenylene, chrysene, picene, tetraphene, pentaphene, diphenyl, biphenylene, perylene, pyrene, or fluorene; product obtained by pulverizing together magnesium chloride and aluminum chloride, alumina, silica, or boria; and product obtained by treating magnesium chloride with ethanol and by subsequent reaction with silicon tetrachloride or diethylaluminum monochloride.

As the method of having a titanium compound and/or a vanadium compound supported on a magnesium halide and/or a manganese halide or on a solid compound which contains a magnesium halide and/or a manganese halide as one component, there may be used known methods. For example, this purpose can be attained by contacting a solid compound containing at least one compound selected from the group consisting of a magnesium halide and a manganese halide with a transition metal compound under heating and in the presence or absence of an inert solvent. Typically, the two are heated to a temperature of 50° to 300° C., preferably 100° to 150° C., in the absence of solvent. In this case, the reaction time is not specially limited, but usually it is not less than 5 minutes. A lengthy treatment, for example ranging from 5 minutes to 10 hours, is acceptable although not necessary. Another supporting procedure is the method in which a solid compound containing at least one compound selected from the group consisting of a magnesium halide and a manganese halide and a titanium compound and/or a vanadium compound are pulverized together. Of course, this operation should be performed in an inert gas atmosphere, and the moisture should be avoided as far as possible.

No particular limitations are placed on the apparatus to be used for the above-mentioned co-pulverization, but usually ball mill, vibration mill, rod mill, and impact mill are used for this purpose. Pulverization conditions such as temperature and time can be decided easily by those skilled in the art according to the pulverization method adopted. Generally, the pulverization temperature ranges from 0° to 200° C., preferably from 20° to 100° C., and the pulverization time from 0.5 to 50 hours, preferably from 1 to 30 hours.

The amount of the titanium compound and/or vanadium compound used in this invention may be an excess amount, but usually they can used in an amount of 0.001 to 50 times by weight based on the weight of magnesium halide and/or manganese halide. Preferably, excess titanium compound and/or vanadium compound are washed off with a solvent after mixing and heat treatment. Means for removing unreacted titanium compound and/or vanadium compound after completion of the reaction are not specially limited, for example, there may be adopted means in which the resulting solid product is washed several times with a solvent inert to Ziegler catalysts and the washings are evaporated under reduced pressure to obtain a solid powder.

The amount of titanium compound and/or vanadium compound to be supported is most preferably adjusted so that the titanium and/or vanadium content of the resulting solid substance is in the range of 0.5% to 20% by weight, and the range of 1% to 10% by weight is particularly preferred.

By way of illustrating the titanium compound and/or vanadium compound used in the invention, mention may be made of compounds which usually are employed as a component of a Ziegler catalyst, for example, halides, alkoxyhalides and halogenated oxides of titanium and/or vanadium. Preferred titanium compounds are of the general formula $Ti(OR)_nX_{4-n}$ wherein R is alkyl, aryl or aralkyl having 1 to 24 carbon atoms and n is $0 \leq n \leq 4$, and also trivalent titanium compounds obtained by reducing these tetravalent titanium compounds with for example titanium, aluminum or an organometallic compound of a Group I-III metal in the Periodic Table. Examples of titanium compounds and vanadium compounds are titanium tetrachloride, titanium tetrabromide, titanium tetraiodide, monoethoxytrichlorotitanium, diethoxydichlorotitanium, triethoxymonochlorotitanium, tetraethoxytitanium, dibutoxydichlorotitanium, tetrabutoxytitanium, titanium phenoxytrichloride, vanadium tetrachloride, vanadium oxytrichloride, ethoxydichlorovanadyl, tetraethoxyvanadium, tributoxyvanadium, and triethoxyvanadium.

The solid component of the catalyst used in this invention is obtained by contacting together (i) a silicon oxide and/or an aluminum oxide, (ii) a compound represented by the general formula ROH, (iii) a substance obtained by supporting a titanium compound and/or a vanadium compound on a solid compound containing at least one compound selected from the group consisting of magnesium and manganese halides and (iv), if required, a compound represented by the general formula R'—O—R''.

In this invention the solid component may be prepared by simultaneously contacting the components (i), (ii), (iii) and if any (iv), but preferably it is prepared by first contacting (i) and (ii), followed by (iii) and subsequently, if required, with (iv). These components may be contacted by various methods, but it is preferable that they be contacted in the presence or absence of an inert solvent. Conditions for this contacting operation involve temperatures ranging from 0° to 300° C., preferably from 10° to 100° C., and durations from 1 minute to 48 hours, preferably from 2 minutes to 10 hours. No special limitations are placed on the inert solvent to be used. Usually there may be employed hydrocarbons or their derivatives which do not deactivate a Ziegler type catalyst, for example, various saturated aliphatic hydrocarbons, aromatic hydrocarbons and alicyclic hydrocarbons such as propane, butane, pentane, hexane, heptane, octane, benzene, toluene, xylene, and cyclohexane.

In the preparation of the solid component, the ingredients are preferably contacted in the following ratios: 0.01–5 g., preferably 0.1–2 g., of component (ii) per gram of component (i); 0.1–100 g., preferably 0.2–10 g., of component (iii) per gram of component (ii); in the case of using component (iv), 0.1–100 g., preferably 0.2–50 g., of component (iv) per gram of component (iii). Further, as to the ratio of component (iii) to component (i), the range of 0.001 g. to 500 g. component (iii) per gram of component (i) is used.

As the organometallic compound to be combined with the above solid component in this invention there may be used organometallic compounds of Group I-IV metals in the Periodic Table which are known as a component of a Ziegler type catalyst, particularly organoaluminum and organozinc compounds are preferred, for example, organoaluminum compounds represented by the general formulae $R_3Al$, $R_2AlX$, $RAlX_2$, $R_2AlOR$, $RAl(OR)_2$, $RAl(OR)X$ and $R_3Al_2X_3$ wherein R is alkyl or aryl and may be alike or different and X is halogen, and organozinc compounds represented by the general formula $R_2Z_n$ wherein R is alkyl and may be alike or different, such as triethylaluminum, triisobutylaluminum, trihexylaluminum, trioctylaluminum, tridecylaluminum, diethylaluminum chloride, ethylaluminum sesquichloride, ethoxydiethylaluminum, diethylzinc, and mixtures thereof. The amount of these organometallic compounds to be used in this invention is not specially limited, but usually they may be employed 0.1 to 1000 moles per mole of titanium compound and/or vanadium compound.

The polymerization reaction of ethylene using the catalyst of the invention is carried out in a slurried or vapor phase condition in the presence or absence of an inert solvent like the conventional olefin polymerization reaction using a Ziegler type catalyst; that is, the reaction is performed in substantially oxygen- and water-free condition. The polymerization conditions for ethylene involve temperatures ranging from 20° to 300° C., preferably from 50° to 180° C., and pressures from atmospheric pressure to 70 kg/cm², preferably from 2 to 60 kg/cm². Adjustment of the molecular weight can be made to some extent by changing polymerization conditions such as the polymerization temperature and the molar ratio of catalyst, but the addition of hydrogen into the polymerization system is more effective for this purpose. Of course, two or more stage polymerization reactions involving different polymerization conditions such as different hydrogen concentrations and different polymerization temperatures can be made without any trouble using the catalyst of this invention.

The process of this invention is applicable to the polymerization of olefins which are polymerizable with a Ziegler type catalyst, for example, it is suitably applied to the homopolymerization of $\alpha$-olefins, preferably those of $C_2$ to $C_{12}$, such as ethylene, propylene and 1-butene, and also to the copolymerization of $\alpha$-olefins such as ethylene/propylene, ethylene/1-butene, and propylene/1-butene. Furthermore, copolymerization of an olefin and a diene for the modification of polyolefin is also conducted preferably, e.g. ethylene/butadiene, ethylene/1,4-hexadiene. Thus the polymerization of olefins in this invention involves both homopolymerization and copolymerization of olefins.

Working examples of this invention are given below, but it is to be understood that they are for illustration only and are not intended to place a limitation thereon.

EXAMPLE 1

(a) Preparation of the solid component

Into 50 ml. of hexane were placed 2 g. of silica (100–200 mesh, vacuum-dried 3 hours at 150° C.) and 1 ml. of ethanol followed by stirring for 30 minutes at room temperature, then 2 g. of a solid substance, which had been obtained by ball-milling in a ball mill 10 g. of magnesium chloride and 1.9 g. of titanium tetrachloride for 16 hours at room temperature in a nitrogen atmosphere, was added followed by further stirring for 10 minutes to give a slurry. The solid component concentration of the slurry was 80 g/100 ml.

(b) Polymerization

A stainless steel 2 liter autoclave equipped with an induction stirrer was purged with nitrogen, and 1000 ml. of hexane, 1 millimole of triethylaluminum and 1 ml. of the above-prepared solid component slurry (containing 80 mg. solid component), were added with stirring while the temperature increased to 85° C. With the vapor pressure of hexane the system was pressurized to 1.7 kg/cm². G. Then hydrogen was introduced to a total pressure of 6 kg/cm². G and thereafter ethylene introduced to a total pressure of 10 kg/cm². G, under which conditions polymerization was started. The polymerization was continued for 1.5 hours while ethylene was introduced continuously so as to maintain the total pressure at 10 kg/cm². G. Thereafter, the polymer slurry was transferred into a beaker and hexane removed under reduced pressure leaving 230 g. of a white polyethylene having a melt index of 13.9 and a bulk density of 0.33. The catalyst activity was 144,000 g.polyethylene/g.Ti.

The average particle size of the polymer powder was $1300\mu$ with the portion below $44\mu$ being 0% and the portion above $710\mu$ 70%. Thus there was found obtainable in high activity the polymer having a reduced proportion of fine particles, a large average particle size and a high bulk density.

COMPARATIVE EXAMPLE 1

Polymerization was made in the same manner as in Example 1 using as the solid component 10 mg. of the substance resulting from co-pulverization of magnesium chloride and titanium tetrachloride used in Example 1, to give 63 g. of a white polyethylene having a melt index of 4.5 and a bulk density of 0.18. The catalyst activity was 158,000 g.polyethylene/g.Ti. The average particle size of the polymer powder was $340\mu$, smaller than that in Example 1, with the portion below $44\mu$ being 0.5% and the portion above $710\mu$ 22.0%. Further, the bulk density was very low.

COMPARATIVE EXAMPLE 2

Polymerization was made in the same manner as in Example 1 except that ethanol was not used, to give 60 g. of a white polyethylene having a melt index of 7.6 and a bulk density of 0.20. The catalyst activity was 150,000 g.polyethylene/g.Ti. The average particle size of the polymer powder was as small as $340\mu$ with the portion below $44\mu$ being 1.0% and the portion above $71\mu$ 22.8%. It is apparent that the polymer powder obtained has a small average particle size and a low bulk density.

COMPARATIVE EXAMPLE 3

Polymerization was made in the same manner as in Example 1 except that silica was not used and the amount of ethanol used was 0.5 ml., to give 59 g. of a white polyethylene having a melt index of 14.0 and a bulk density of 0.22. The catalyst activity was 148,000 g.polyethylene/g.Ti. The average particle size of the polymer powder was small, $500\mu$, with the portion below $44\mu$ being 1.0% and the portion above $710\mu$ 38.7%. There was obtained only polymer powder having a low bulk density though its average particle size is relatively large.

EXAMPLE 2

Polymerization was made in the same manner as in Example 1 except that alumina (100-200 mesh, vacuum-dried 3 hours at 150° C.) was used in place of silica, to give 226 g. of a white polyethylene having a melt index of 11.0 and a bulk density of 0.30. The catalyst activity was 141,000 g.polyethylene/g.Ti. The average particle size of the polymer powder was $760\mu$ with the portion below $44\mu$ being 0% and the portion above $710\mu$ 51%. Thus there was obtained in high activity the polymer having a reduced proportion of fine particles, a large average particle size and a high bulk density.

EXAMPLE 3

Polymerization was made in the same manner as in Example 1 except that methanol was used in place of ethanol, to yield 238 g. of a white polyethylene having a melt index of 12.0 and a bulk density of 0.35. The average particle size of the polymer powder was $1500\mu$ with the portion below $44\mu$ being 0% and the portion above $710\mu$ 80.0%. Thus there was obtained in high activity the polymer having a reduced proportion of fine particles, a large average particle size and a high bulk density.

EXAMPLE 4

Polymerization was made in the same manner as in Example 1 except that 5 g. and not 2 g. of silica was used, that in place of the co-pulverized product from magnesium chloride and titanium tetrachloride there was used a solid substance obtained by ball-milling in a ball mill 9.3 g. of magnesium chloride, 0.7 g. of aluminum chloride and 1.9 g. of titanium tetrachloride for 16 hours at room temperature in a nitrogen atmosphere and that 140 mg. of the solid component was used in the polymerization, to yield 240 g. of polyethylene having a melt index of 11.0 and a bulk density of 0.30. The catalyst activity was 150,000 g.polyethylene/g.Ti. The average particle size of the polyethylene was $680\mu$ with the portion below $88\mu$ being 0% and the portion above $710\mu$ 47.5%. Thus there was obtained in high activity the polymer having a reduced proportion of fine particles, a large average particle size and a high bulk density.

EXAMPLE 5

In Example 1 the ethanol was substituted by 2 ml. of butanol, and in place of the co-pulverized product from magnesium chloride and titanium tetrachloride there was used a solid substance obtained by ball-milling in a ball mill 9.5 g. of a reaction product—which had been obtained by reacting 40 g. of magnesium oxide and 133 g. of aluminum chloride for 4 hours at 300° C.—and 1.7 g. of titanium tetrachloride for 16 hours at room temperature in a nitrogen atmosphere, and using this solid substance there was prepared a slurry. Thereafter, co-polymerization of ethylene and propylene was conducted in the following manner.

In the same procedure as in Example 1 there were charged in the autoclave 1000 ml. of hexane, 1 millimole of triethylaluminum and 1 ml. of the slurry prepared above (containing 80 mg. solid component), and the temperature was raised to 85° C. Hydrogen was then introduced to a total pressure of 6 kg/cm². G and thereafter a mixed ethylene-propylene gas containing 2 mole% propylene was fed to maintain the pressure within the autoclave at 10 kg/cm².G, under which condition a polymerization was carried out for 1.5 hours, to yield 250 g. of a white polyethylene containing 5.1 methyl groups per 1000 carbon atoms and having a melt index of 11.7 and a bulk density of 0.30. The catalyst activity was 156,000 g.polymer/g.Ti.

The average particle size of the polymer powder was $900\mu$ with the portion below $44\mu$ being 0% and the portion above $710\mu$ 58.2%. Thus there was obtained in high activity the polymer having a reduced proportion of fine particles, a large average particle size and a high bulk density.

EXAMPLE 6

(a) Preparation of the solid component

Into 50 ml. of hexane were placed 2 g. of silica (100–200 mesh, dried 3 hours at 150° C.) and 1 ml. of ethanol followed by stirring for 30 minutes at room temperature, then 2 g. of a solid substance, which had been obtained by ball-milling in a ball mill 10 g. of magnesium chloride and 1.9 g. of titanium tetrachloride for 16 hours at room temperature in a nitrogen atmosphere, was added followed by further stirring for 10 minutes to give a slurry. To the slurry was further added 20 ml. of diethyl ether and then stirring was applied for 4 hours at room temperature followed by washing with four 50 ml. portions of hexane to give a solid component slurry, whose solid component concentration was 8 g/100 ml.

(b) Polymerization

A stainless steel 2 liter autoclave equipped with an induction stirrer was purged with nitrogen, into which were then placed 1000 ml. of hexane, 1 millimole of triethylaluminum and 1 ml. of the solid component slurry prepared above (containing 80 mg. solid component), and the temperature was raised to 85° C. with stirring. With the vapor pressure of hexane the system was pressurized to 1.7 kg/cm$^2$.G. Then hydrogen was introduced to a total pressure of 6 kg/cm$^2$.G and thereafter ethylene introduced to a total pressure of 10 kg/cm$^2$.G, under which condition a polymerization was started. The polymerization was continued for 3 hours while ethylene was introduced continuously so as to maintain the total pressure at 10 kg/cm$^2$.G. Thereafter, the polymer slurry was transferred into a beaker and hexane removed under reduced pressure leaving 250 g. of a white polyethylene having a melt index of 9.8 and a bulk density of 0.44. The catalyst activity was 156,000 g.polyethylene/g.Ti.

The average particle size of the polymer powder was 1000μ with the portion below 44μ being 0% and the portion above 710μ 65%. Thus there was found obtainable in high activity the polymer having a reduced proportion of fine particles, a large average particle size and a high bulk density.

The polymer powder when observed with an optical microscope was found to have a nearly spherical particle shape and a smooth surface.

COMPARATIVE EXAMPLE 4

The solid component was prepared in the same way as in Example 6 except that the treatment with diethyl ether was not applied, and polymerization was carried out in the same manner as in Example 6 to yield 330 g. of a white polyethylene having a melt index of 13 and a bulk density of 0.33.

As compared with the results obtained in Example 6, the bulk density here obtained was inferior and the particles of the polymer powder when observed with an optical microscope were found to be amorphous.

EXAMPLE 7

The solid component was prepared in the same way as in Example 6 except that alumina (100–200 mesh, vacuum-dried 3 hours at 150° C.) was used in place of silica, and polymerization was carried out in the same manner as in Example 6 to yield 200 g. of a white polyethylene having a melt index of 12 and a bulk density of 0.40. The catalyst activity was 125,000 g.polyethylene/g.Ti.

The average particle size of the polymer powder was 660μ with the portion below 44μ being 0% and the portion above 710μ 40%. Thus there was found obtainable in high activity the polymer having a reduced proportion of fine particle a large average particle size and a high bulk density.

The polymer powder when observed with an optical microscope was found to have a nearly spherical particle shape and a smooth surface.

EXAMPLE 8

The solid component was prepared in the same way as in Example 6 except that hydrotalcite was used in place of silica, and polymerization was carried out in the same manner as in Example 6 to yield 190 g. of a white polyethylene having a melt index of 7.6 and a bulk density of 0.39. The catalyst activity was 118,800 g. polyethylene/g.Ti.

The average particle size of the polymer powder was 1100μ with the portion below 44μ being 0% and the portion above 710μ 70%. Thus there was found obtainable in high activity the polymer having a reduced proportion of fine particles, a large average particle size and a high bulk density.

The polymer powder when observed with an optical microscope was found to have a nearly spherical particle shape and a smooth surface.

EXAMPLE 9

There was prepared a solid component slurry in the same way as in Example 6 except that in place of the co-pulverized product from magnesium chloride and titanium tetrachloride there was used a solid substance obtained by ball-milling 9.5 g. of a reaction product— which had been obtained by reacting 40 g. of magnesium oxide and 133 g. of aluminum chloride for 4 hours at 300° C.—and 1.7 g. of titanium tetrachloride for 16 hours at room temperature in a nitrogen atmosphere, and further except that the diethyl ether was substituted by 15 ml. of dibutyl ether. The solid component concentration of the slurry was 8 g/100 ml.

In the same procedure as in Example 6 there were charged in the autoclave 1000 ml. of hexane, 1 millimole of triethylaluminum and 1 ml. of the solid component slurry prepared above (containing 80 mg. solid component), and the temperature was raised to 85° C. Hydrogen was then introduced to a total pressure of 6 kg/cm$^2$.G and thereafter a mixed ethylene-propylene gas containing 2mole% of propylene was fed to maintain the pressure within the autoclave at 10 kg/cm$^2$.G, under which condition a polymerization was carried out for 3 hours, to yield 230 g. of a white polyethylene containing 5.1 methyl groups per 1000 carbon atoms and having a melt index of 8 and a bulk density of 0.41. The catalyst activity was 143,800 g. polyethylene/g.Ti.

The average particle size of the polymer powder was 950μ with the portion below 44μ being 0% and the portion above 710μ 60%. Thus there was obtained in high activity the polymer having a reduced proportion of fine particles, a large average particle size and a high bulk density.

The polymer powder when observed with an optical microscope was found to have a nearly spherical particle shape.

We claim:

1. A process for polymerizing at least one olefin using a catalyst, said catalyst comprising a solid component and an organometallic compound, characterized in that said solid component is a solid product obtained by contacting together the following components (i)-(iii):
   (i) at least one compound selected from the group consisting of a silicon oxide and aluminum oxide,
   (ii) a compound represented by the general formula ROH wherein R is a hydrocarbon radical having 1 to 20 carbon atoms, and
   (iii) a substance obtained by supporting at least one compound selected from the group consisting of a titanium compound and a vanadium compound on a solid compound containing at least one compound selected from the group consisting of a magnesium halide and a manganese halide; there being in said solid component 0.01 to 5 g of compound (ii) per gram of compound (i), 0.1 to 100 g of substance (iii) per gram of compound (ii) and 0.001–500 g of substance (iii) per gram of compound (i).

2. A process for polymerizing at least one olefin using a catalyst, said catalyst comprising a solid component and an organometallic compound, characterized in that said component is a solid product obtained by contacting together the following components (i)-(iv):
   (i) at least one compound selected from the group consisting of a silicon oxide and an aluminum oxide,
   (ii) a compound represented by the general formula ROH wherein R is a hydrocarbon radical having 1 to 20 carbon atoms,
   (iii) a substance obtained by supporting at least one compound selected from the group consisting of a titanium compound and a vanadium compound on a solid compound containing at least one compound selected from the group consisting of a magnesium halide and a manganese halide, and
   (iv) a compound represented by the general formula R'—O—R" wherein R' and R", which may be alike or different, are each a hydrocarbon radical having 1 to 20 carbon atoms;
there being in said solid component 0.01 to 5 g of compound (ii) per gram of compound (i), 0.1 to 100 g of substance (iii) per gram of compound (ii), 0.1 to 100 g of compound (iv) per gram of substance (iii), and 0.001 to 500 g of substance (iii) per gram of compound (i).

3. The process as defined in any of claims 1 or 2, in which said silicon oxide is an oxide selected from the group consisting of silica and a double oxide of silicon and at least one other metal of Groups I-VIII in the Periodic Table.

4. The process as defined in any of claims 1 or 2, in which said aluminum oxide is an oxide selected from the group consisting of alumina and a double oxide of aluminum and at least one other metal of Groups I-VIII in the Periodic Table.

5. The process as defined in any of claims 1 or 2, in which said solid compound is a magnesium halide and/or a manganese halide.

6. The process as defined in any of claims 1 or 2, in which said solid compound is obtained by treating a magnesium halide and/or a manganese halide with an electron donor.

7. The process as defined in any of claims 1 or 2, in which said solid compound is a complex consisting of a magnesium halide and/or a manganese halide and a compound represented by the general formula Me(OR)$_m$X$_{l-m}$ wherein Me represents an element of Groups I-VIII in the Periodic Table, provided that titanium and vanadium are excluded from Me, l is the valence of the element Me, m is $0 < m \leq l$, X is a halogen atom, which R is a hydrocarbon radical having 1 to 20 carbon atoms and may be alike or different.

8. The process as defined in any of claims 1 or 2, in which said solid compound is a product obtained by pulverizing together a magnesium halide and/or a manganese halide and polycyclic aromatic compound.

9. The process as defined in any of claims 1 or 2, in which said solid compound is a product obtained by pulverizing together a magnesium halide and/or a manganese halide and an anhydrous compound containing an element of Groups III and IV in the Periodic Table.

10. The process as defined in any of claims 1 or 2, in which said solid compound is a product obtained by pre-treating a magnesium halide and/or a manganese halide with an alcohol and subsequent reaction with silicon tetrahalide or an organoaluminum compound.

11. The process as defined in any of claims 1 or 2, in which the R of the compound represented by the general formula ROH is an alkyl group having 1 to 20 carbon atoms.

12. The process as defined in claim 2, in which the R' and R" of the compound represented by the general formula R'—O—R" are each an alkyl group having 1 to 20 carbon atoms which may be alike or different.

13. The process as defined in any of claims 1 or 2, in which said olefin is an alpha olefin having 2 to 12 carbon atoms.

14. The process as defined in any of claims 1 or 2, in which said olefin is ethylene.

15. The process as defined in any of claims 1 or 2, in which the polymerization reaction is carried out at a temperature in the range of from 20° to 300° C. and at a pressure in the range of from atmospheric pressure to 70 kg/cm$^2$.

16. The process as defined in any of claims 1 or 2, in which said organometallic compound is a compound selected from the group consisting of organoaluminum compounds and organozinc compounds.

* * * * *